(12) United States Patent
Kiss et al.

(10) Patent No.: US 12,451,555 B2
(45) Date of Patent: Oct. 21, 2025

(54) BATTERY DEVICE FOR A MOTOR VEHICLE

(71) Applicant: KNORR-BREMSE Systeme fuer Nutzfahrzeuge GmbH, Munich (DE)

(72) Inventors: David Kiss, Szar (HU); Andras Derzsi, Mogyorod (HU); Peter Lindner, Rackeve (HU); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 5 days.

(21) Appl. No.: 18/565,181

(22) PCT Filed: Jul. 18, 2022

(86) PCT No.: PCT/EP2022/070078
§ 371 (c)(1),
(2) Date: Nov. 29, 2023

(87) PCT Pub. No.: WO2023/001770
PCT Pub. Date: Jan. 26, 2023

(65) Prior Publication Data
US 2024/0363953 A1    Oct. 31, 2024

(30) Foreign Application Priority Data

Jul. 20, 2021  (EP) .................................. 21186761

(51) Int. Cl.
*B60R 16/033* (2006.01)
*H01M 10/42* (2006.01)
(Continued)

(52) U.S. Cl.
CPC ......... *H01M 50/296* (2021.01); *B60R 16/033* (2013.01); *H01M 10/425* (2013.01);
(Continued)

(58) Field of Classification Search
CPC ............. H01M 50/51; H01M 2220/20; H01M 50/204; B60L 58/22; B60L 58/18
(Continued)

(56) References Cited

U.S. PATENT DOCUMENTS

2013/0063093 A1* 3/2013 Sato .......................... H02J 7/00
320/134
2014/0159663 A1* 6/2014 Miyanaga ............. H02J 7/0016
320/116
(Continued)

FOREIGN PATENT DOCUMENTS

DE    10 2019 130 738 A1    5/2021

OTHER PUBLICATIONS

International Search Report (PCT/ISA/210) issued in PCT Application No. PCT/EP2022/070078 dated Sep. 2, 2022 (2 pages).
(Continued)

*Primary Examiner* — Rexford N Barnie
*Assistant Examiner* — Swarna N Chowdhuri
(74) *Attorney, Agent, or Firm* — Crowell & Moring LLP

(57) ABSTRACT

A battery device for providing different electrical voltage levels to be used by different electrical consumer devices, particularly for use in a motor vehicle such as a utility vehicle or a commercial vehicle, includes at least one battery storage unit. Each battery storage unit has a low voltage terminal and a high voltage terminal, wherein one or more battery storage units of the at least one battery storage unit has at least one intermediate voltage terminal which is connected between the low voltage terminal and the high voltage terminal of the respective battery storage unit. Each battery storage unit can include a plurality of battery cells connected in series with each other between the low voltage terminal and the high voltage terminal, wherein each battery cell provides a predetermined voltage, and wherein the at (Continued)

least one intermediate voltage terminal is connected between two adjacent battery cells of the plurality of battery cells.

11 Claims, 1 Drawing Sheet

(51) Int. Cl.
  *H01M 50/204* (2021.01)
  *H01M 50/296* (2021.01)
  *H01M 50/507* (2021.01)
  *H01M 50/51* (2021.01)
(52) U.S. Cl.
  CPC ....... *H01M 50/204* (2021.01); *H01M 50/507* (2021.01); *H01M 50/51* (2021.01); *H01M 2220/20* (2013.01)
(58) Field of Classification Search
  USPC .................................................. 307/9.1, 10.1
  See application file for complete search history.

(56) References Cited

U.S. PATENT DOCUMENTS

| | | | |
|---|---|---|---|
| 2014/0266051 A1* | 9/2014 | Hayakawa | H02J 7/0016 320/118 |
| 2015/0380776 A1* | 12/2015 | Partes | B60L 58/22 429/61 |
| 2016/0339795 A1* | 11/2016 | Fink | H02J 7/34 |
| 2021/0151726 A1 | 5/2021 | Hinterberger et al. | |

OTHER PUBLICATIONS

Written Opinion (PCT/ISA/237) issued in PCT Application No. PCT/EP2022/070078 dated Sep. 2, 2022 (7 pages).

Extended European Search Report issued in European Application No. 21186761.9 dated Dec. 13, 2021 (9 pages).

* cited by examiner

BATTERY DEVICE FOR A MOTOR VEHICLE

BACKGROUND AND SUMMARY

The invention relates to a battery device for providing different electrical voltage levels to be used by different electrical consumer devices, particularly for use in a motor vehicle, particularly a utility vehicle or a commercial vehicle.

Motor vehicles, such as utility or commercial vehicles or trucks, normally have various electrical consumer devices or appliances on-board which typically are operated at different electrical voltages. For example, such consumer devices can encompass vehicle on-board power supply systems, sensors, etc., which e.g. are operated at a voltage of 12 V. Other consumer devices can encompass computer devices, communication systems, display devices, electronic control units or modules (ECU, ECM), etc., which e.g. are operated at a voltage of 24 V. Furthermore, systems and devices for braking the vehicle are typically operated at a voltage of 48 V.

In order to provide these or other different electrical supply voltages that are required in a vehicle, typically a specific stand-alone energy storage and supply unit, particularly a battery storage unit, is required for each respective voltage level. Thus, a variety of separate, specific and independent battery storage units are normally present in vehicles, such as utility vehicles or trucks. This plurality of individual battery storage units consequently occupies a certain space or volume within the vehicle which space thus cannot be utilized for other purposes. Furthermore, the weight of the plurality of separate battery storage units increases the overall weight or mass of the vehicle. Eventually, this occupation of space and increase in weight contributes to an overall increase in the efforts and costs for operating and servicing the concerned vehicle.

Therefore, it is an object of the present invention to provide an energy storage and supply system, particularly a battery device, which enables a supply of different electrical voltages for different electrical consumer devices or appliances in a motor vehicle and which, at the same time, enables a reduction and optimization of the amount of space or volume that is occupied by said energy storage and supply system as well as a reduction of the overall vehicle weight, and which, consequently, contributes to a decrease in costs involved with the operation and maintenance of the vehicle.

According to the present invention, this aim is achieved by a battery device in accordance with the independent claims. Accordingly, a battery device for providing different electrical voltage levels to be used by different electrical consumer devices, particularly for use in a motor vehicle, particularly a utility vehicle or a commercial vehicle, comprises at least one battery storage unit, wherein each battery storage unit comprises a low voltage terminal and a high voltage terminal, and wherein one or more battery storage units of the at least one battery storage unit comprise at least one intermediate voltage terminal which is connected between the low voltage terminal and the high voltage terminal of the respective battery storage unit. Optionally, an intermediate voltage terminal can also be connected at the low voltage terminal and/or at the high voltage terminal of the respective battery storage unit.

Generally, an electrical voltage is obtained or tapped or extracted between two electrical terminals of which one terminal has a lower electrical potential or electrical voltage level and of which the other terminal has a higher electrical potential or electrical voltage level. The electrical voltage tapped between these two electrical terminals is the difference between said higher and said lower electrical voltage levels or potentials. Therein, the lower electrical potential can typically be the ground potential having no voltage or a Zero voltage. However, in other cases, the lower electrical potential can as such have a certain voltage level.

Insofar as a low voltage terminal, an intermediate voltage terminal and a high voltage terminal are mentioned in the context of the present invention, it is to be understood that, besides the respective physical terminals as such, this generally also designates respective low, intermediate and high voltage levels or electrical potentials and/or their relationship with respect to each other.

Thus, according to the invention, in the case that at least one intermediate voltage terminal is connected with a battery storage unit between a low voltage terminal and a high voltage terminal, a voltage can be tapped or obtained between the low voltage terminal and the intermediate voltage terminal. Therein, this tapped voltage is the difference between the electrical voltage levels or potentials of said intermediate and said low voltage terminals. The voltage level of the intermediate voltage terminal is higher than the voltage level of the low voltage terminal but lower than the voltage level of the high voltage terminal.

Furthermore, in the case that at least one intermediate voltage terminal is connected with a battery storage unit between a low voltage terminal and a high voltage terminal, a voltage can also be tapped or obtained between the intermediate voltage terminal and the high voltage terminal. Therein, this tapped voltage is the difference between the electrical voltage levels or potentials of said high and said intermediate voltage terminals.

Besides, the at least one intermediate voltage terminal may also be connected with the low voltage terminal and/or with the high voltage terminal of the respective battery storage unit. In this case, the voltage level of the respective intermediate voltage terminal corresponds to the voltage level of the concerned low voltage terminal and/or high voltage terminal.

Thus, according to the invention, a voltage can generally be tapped between any two of the low and high voltage terminals and the one or more intermediate voltage terminals of the respective one or more battery storage units of the battery device.

A single battery storage unit of the invention can accordingly provide voltages at least at the intermediate level of the intermediate voltage terminal and at the high voltage level, always with respect or in relation to a reference terminal having a respectively lower voltage level. Furthermore, the battery storage unit can provide voltages at the low voltage level if the low voltage terminal actually does provide a certain voltage level as compared to a respectively even lower reference voltage level and if said low voltage terminal does not correspond to or is not connected with the ground terminal. Otherwise, if the low voltage terminal corresponds to the ground terminal, then no electrical voltage or a Zero voltage, respectively, can be obtained at the low voltage terminal.

Accordingly, the low voltage terminal provides a Zero or a minimum electrical voltage of the concerned battery storage unit, whereas the high voltage terminal provides a maximum electrical voltage of the concerned battery storage unit. The intermediate voltage terminal then outputs a partial voltage as compared to said maximum voltage. Said voltage outputs or tappings always are to be understood in relation to a respectively lower reference voltage level. This lower reference voltage level can be, but does not have to be, the ground level.

If more than one intermediate voltage terminal is connected with a battery storage unit, that respective battery storage unit provides or permits a tapping of voltages at the various intermediate levels of the multiple intermediate voltage terminals, in addition to the high voltage level of the high voltage terminal and, if applicable, the low voltage level of the low voltage terminal.

Therefore, the battery device of the invention can provide different electrical voltage levels for different electrical consumer devices or appliances, particularly for use in a motor vehicle, by the provision of a single battery storage unit which comprises at least one intermediate voltage terminal connected between a low voltage terminal and a high voltage terminal and/or at the low voltage terminal and/or at the high voltage terminal of the respective battery storage unit.

According to a preferred embodiment of the battery device of the invention, each battery storage unit comprises a plurality of battery cells connected in row or in series with each other between the low voltage terminal and the high voltage terminal, wherein each battery cell provides a predetermined electrical voltage, and wherein the at least one intermediate voltage terminal is connected between two adjacent battery cells of the plurality of battery cells.

In the basic realization of this embodiment, the low voltage terminal of a single battery storage unit or of a first battery storage unit of the at least one battery storage unit (i.e. of a plurality of battery storage units) consists of or is connected with the ground terminal (which as such provides no electrical voltage or a Zero voltage). Therein, the at least one intermediate voltage terminal provides or permits the tapping of an intermediate electrical voltage output which corresponds to the sum of the individual predetermined voltages of the battery cells which are connected between the ground terminal and said intermediate voltage terminal.

In this case, the high voltage terminal as such, or the intermediate voltage terminal if it is connected with the high voltage terminal of the respective battery storage unit, provides or permits the tapping of a high or maximum voltage output of the concerned battery storage unit. This tapped high voltage corresponds to the sum of the individual predetermined voltages of all the battery cells that are contained in the respective battery storage unit, i.e. all the battery cells which are connected in series with each other between the ground terminal and said high voltage terminal.

In another embodiment of the battery device of the invention, it is possible that the intermediate voltage terminal is connected with the high voltage terminal of the respective battery storage unit. The high voltage which is obtained or tapped at the high voltage terminal, e.g. in relation to the ground terminal, can then be transformed electrically by suitable means to a lower voltage, i.e. an intermediate voltage at a level which is lower than the voltage level of the high voltage terminal.

According to a further preferred embodiment of the invention, the battery device comprises at least two battery storage units connected in series with each other. Therein, the low voltage terminal of a first battery storage unit of the at least two battery storage units is the ground terminal, and the high voltage terminal of said first battery storage unit is connected to the low voltage terminal of a second battery storage unit of the at least two battery storage units. Furthermore, at least one intermediate voltage terminal is respectively connected between two adjacent battery cells of said first battery storage unit and/or said second battery storage unit and/or at the low voltage terminal and/or at the high voltage terminal of said second battery storage unit. Therein, each intermediate voltage terminal provides an intermediate voltage output (or allows the tapping of an intermediate voltage in relation to the ground terminal) which corresponds to the sum of the predetermined voltages of the battery cells which are connected between the ground terminal and said intermediate voltage terminal.

In a further preferred embodiment of the invention, each individual battery cell in the battery storage unit provides the same predetermined electrical voltage. However, it is also conceivable that the individual battery cells or groups of battery cells within the battery storage unit have different electrical voltages. For practical applications in a motor vehicle, particularly a utility vehicle or a commercial vehicle, it is preferred that each individual battery cell has a voltage of 2.4 V or an integer multiple thereof. However, other voltages are also conceivable. Thus, the overall voltage of a group of battery cells connected in series with each other typically equals the sum of the predetermined individual voltages of the battery cells within said group, or, if all battery cells in the group have the same predetermined voltage, the number of battery cells within said group multiplied by the individual voltage of the battery cells, e.g. 2.4 V.

In a further preferred embodiment of the invention, each battery storage unit comprises five or ten battery cells connected in row with each other. However, other numbers of battery cells are also conceivable. For example, the number of battery cells can be an integer multiple of five. Thus, in the case of ten battery cells within the battery storage unit, wherein each battery cell has the same voltage of 2.4 V, the total or maximum voltage of the battery storage unit, i.e. the voltage tapped or obtained between the ground terminal and the high voltage terminal, amounts to 24 V. Accordingly, an intermediate voltage tapped or obtained at an intermediate voltage terminal of a battery storage unit equals the number of battery cells which are connected between the ground terminal and said intermediate voltage terminal multiplied by the predetermined voltage of said individual battery cells, here preferably 2.4 V each.

Consequently, in an embodiment where the battery device of the invention comprises two battery storage units connected in series with each other, and based on the precedingly mentioned physical values and numbers of ten battery cells within each single battery storage unit, wherein each battery cell has a predetermined voltage of 2.4 V, and wherein the low voltage terminal of the first of said two battery storage units is the ground terminal, the high voltage terminal of the first battery storage unit (which corresponds to or connects with the low voltage terminal of the second battery storage unit) provides a voltage output of 24 V in relation to the ground terminal, and the high voltage terminal of the second battery storage unit provides a voltage output of 48 V in relation to the ground terminal.

In this case, the at least one intermediate voltage terminal, which can be connected between any of two adjacent battery cells of the first and/or the second battery storage unit, i.e. also at the high voltage terminal of the first battery storage unit (which corresponds to the low voltage terminal of the second battery storage unit), provides an intermediate voltage output (or allows the tapping of an intermediate voltage in relation to the ground terminal) which corresponds to the number of battery cells which are respectively connected between the ground terminal and said intermediate voltage terminal multiplied by the predetermined voltage of said individual battery cells of 2.4 V.

In this latter embodiment, one intermediate voltage terminal can for example be connected between the fifth battery cell and the sixth battery cell of the row of ten battery cells in said first battery storage unit, so that this intermediate voltage terminal provides an intermediate voltage output of 12 V. Likewise, one intermediate voltage terminal can for example be connected between the fifth battery cell and the sixth battery cell of the row of ten battery cells in said second battery storage unit, so that this intermediate voltage terminal provides an intermediate voltage output of 36 V.

As mentioned above, other numbers of battery cells within a single battery storage unit and/or other or different voltage values of each individual battery cell are also conceivable, thus resulting in other overall voltages that are tapped or obtained at the low voltage terminals, the high voltage terminals and the one or more intermediate voltage terminals. Besides, more than two battery storage units can be connected in series with each other within the complete battery device of the invention, wherein substantially the same principles apply as they are explained above with respect to two battery storage units.

As mentioned above, the invention also encompasses embodiments in which a voltage is not only tapped between the ground terminal and a low, intermediate and/or high voltage terminal which each are on a respectively higher voltage level over the ground level. Rather, applying substantially the same principles as they are explained above, a voltage can also be tapped between any two of the various terminals of the one or more battery storage units irrespective of the ground terminal, e.g. between an intermediate voltage terminal and the high voltage terminal of one concerned battery storage unit, or between an intermediate voltage terminal of a first battery storage unit and an intermediate voltage terminal of a subsequent battery storage unit in a row of multiple battery storage units, and so on.

If an electrical consumer device, e.g. of a motor vehicle, is connected with and operated by an intermediate voltage terminal of the battery device, electrical current is typically drawn from those battery cells that are connected between the ground terminal and the intermediate voltage terminal. Thereby, the state of electrical charge of the concerned battery cells is reduced, whereas the state of electrical charge of the battery cells that are connected between the intermediate voltage terminal and the high voltage terminal normally is not affected and is thus not reduced. This results in an asymmetrical current load on the entirety of the battery cells of the concerned battery storage unit. Such non-uniform discharging of or asymmetrical current load on the battery cells is detrimental in view of a life-time, a capability to maintain a certain charging capacity, and other factors of the battery cells.

In order to avoid such detrimental effects, the battery device of the invention can encompass devices which avoid or compensate said asymmetrical current load on the battery cells and/or which restore and/or maintain the same state of charge of all the battery cells of each battery storage unit. Said devices can comprise or consist of one or more DC-DC converters, wherein e.g. respectively one DC-DC converter is associated with or connected with each intermediate voltage terminal and/or each low voltage terminal and/or each high voltage terminal. Therein, the DC-DC converters are configured to compensate an asymmetrical current load on the battery cells of the battery storage unit. Furthermore, the DC-DC converters are configured to restore and/or to maintain the same state of charge of all the battery cells of each battery storage unit.

A DC-DC converter is normally necessary for every voltage level that shall be tapped or extracted from the battery device. Whenever a voltage is extracted between two terminals, a DC-DC converter is needed to compensate the asymmetrical load. Thus, depending on the number of voltages to be extracted, normally a corresponding number of DC-DC converters is needed. The DC-DC converters may be integrated in or may be a part of a main control board which is connected to the voltage terminals of the battery device. Thus, there is a connection between the DC-DC converters and the voltage terminals to allow for compensation of the asymmetrical current loads. It is to be understood that besides DC-DC converters also other types or kinds of voltage converters are conceivable and may be suitable.

In the battery device of the invention, the one or more intermediate voltage terminals typically are fixedly, i.e. non-movably, connected between the respective two adjacent battery cells of the plurality of battery cells and/or at the low voltage terminal and/or at the high voltage terminal of the respective battery storage unit. Accordingly, each one intermediate voltage terminal outputs or allows the tapping of a fixed specific intermediate voltage.

Additionally, the battery device of the invention can encompass a switching device which is combined with at least two intermediate voltage terminals. This switching device can be configured to switch over between the at least two intermediate voltage terminals in order to provide either one of the at least two different intermediate voltages of said terminals at the output of the battery device. This arrangement is useful to provide a flexibility in the application of the battery device e.g. in a motor vehicle which requires only certain specific voltages for an operation of its consumer devices, whereas the battery device as such is configured to actually provide more, different voltages some of which may only be needed in other applications.

In contrast to the above mentioned fixed, non-movable installation of the intermediate voltage terminals, another embodiment of the invention provides that the intermediate voltage terminals are configured to be movable to be variably connected between any two adjacent battery cells of the plurality of battery cells and/or at the low voltage terminal and/or at the high voltage terminal of the respective battery storage unit. To this end, the individual battery cells and the low and high voltage terminals can for example be attached to a connector rail which can slidingly be engaged by a connector end of the intermediate voltage terminal. Accordingly, e.g. with reference to the ground terminal, each intermediate voltage terminal can selectively output or allow the tapping of different specific intermediate voltages depending on its respectively selected position, e.g. on the connector rail, at the battery cells and/or the low or high voltage terminals.

The invention also encompasses a method for providing different electrical voltage levels to be used by different electrical consumer devices, particularly for use in a motor vehicle, wherein the method uses a battery device according to the invention as described above.

Furthermore, the invention also encompasses a motor vehicle comprising a battery device according to the invention as described above for providing different electrical voltage levels to be used by different electrical consumer devices of the motor vehicle. Particularly, this motor vehicle comprises an onboard power supply system which is connected to the battery device of the invention as described above. Therein, the battery device supplies electric energy, i.e. multiple voltages preferably of integer multiples of 12 V, in particular 12 V, 24 V and/or 48 V. However, other voltage values are likewise conceivable.

The motor vehicle of the invention can particularly be configured as a utility vehicle, a commercial vehicle, a truck, a trailer, a passenger car, and/or a combination of a towing vehicle and a trailer. Additionally or alternatively, the vehicle can be configured as an electric, hybrid or conventional vehicle.

Further details and advantages of the invention will be explained in the following detailed description of various embodiments of the invention in combination with the attached drawings.

DETAILED DESCRIPTION OF THE DRAWINGS

Figure 1:
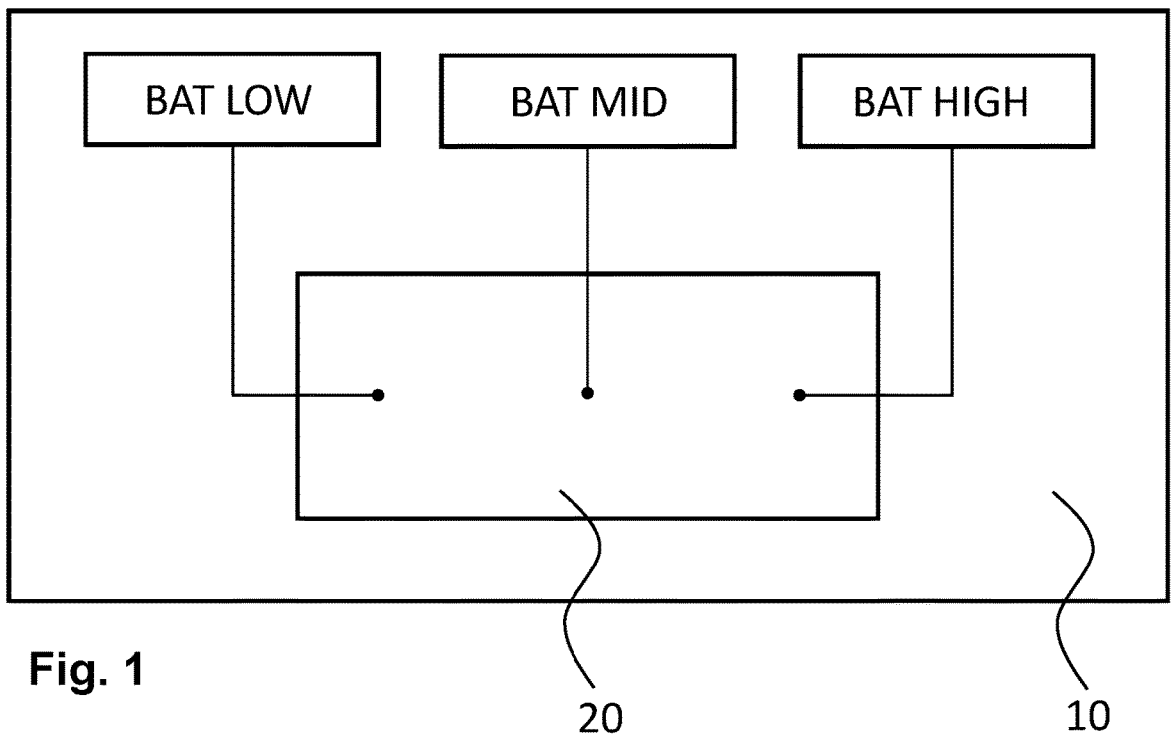
FIG. 1 shows a battery device according to an embodiment of the present invention in a simplified schematic representation.

FIG. 1 schematically shows an electrical battery device 10 which comprises an electrical battery storage unit 20 having a low voltage terminal BAT LOW and a high voltage terminal BAT HIGH connected thereto. The low voltage terminal BAT LOW may be connected to or consist of the ground terminal BAT GND, i.e. may as such not have an electrical voltage. Alternatively, the low voltage terminal BAT LOW may not be connected to the ground terminal BAT GND so that it may as such provide an electrical voltage on a certain level, i.e. a minimum voltage of the battery storage unit 20. The high voltage terminal BAT HIGH renders a maximum electrical voltage of the battery storage unit 20.

Furthermore, an intermediate voltage terminal BAT MID is connected to the electrical battery storage unit 20 between the low voltage terminal BAT LOW and the high voltage terminal BAT HIGH. With respect to the ground terminal BAT GND, the intermediate voltage terminal BAT MID thus outputs or permits the tapping of an electrical voltage at an intermediate or middle level which typically is higher than the voltage level of the low voltage terminal BAT LOW but lower than the voltage level of the high voltage terminal BAT HIGH. In other words, the intermediate voltage terminal BAT MID outputs a partial voltage as compared to the maximum voltage of the high voltage terminal BAT HIGH.

Generally, as mentioned above, an electrical voltage which is obtained or tapped or extracted between any two terminals is made up of the difference between the electrical voltage levels or electrical potentials of said two terminals.

In other embodiments (not shown in FIG. 1), instead of just one intermediate voltage terminal BAT MID, two or more intermediate voltage terminals can be connected with the battery storage unit 20, preferably at different positions or portions of the battery storage unit 20 and/or preferably in succession to each other, thus respectively rendering voltages at different intermediate or middle levels or values.

In a practical application for a motor vehicle such as a utility vehicle or a truck, said low, intermediate and high voltage terminals respectively of a single battery storage unit 20 supply voltages which are particularly useful for an operation of various electrical consumer devices or appliances of the motor vehicle requiring different operating voltages. For example, the low voltage terminal BAT LOW is the ground terminal BAT GND, i.e. having a voltage of 0 V, and the high voltage terminal BAT HIGH has a voltage of e.g. 24 V. The intermediate voltage terminal BAT MID can be arranged to provide any voltage in between said two extremes, e.g. a voltage of 12 V. It is to be understood that any other voltage values are likewise possible depending on the respective application.

In another embodiment which is not shown in FIG. 1, the one or more intermediate voltage terminals BAT MID can electrically be connected directly with the low voltage terminal BAT LOW and/or with the high voltage terminal BAT HIGH of the battery storage unit 20. The intermediate voltage terminal BAT MID then respectively outputs a voltage which corresponds to the voltage level or value of the low voltage terminal BAT LOW or of the high voltage terminal BAT HIGH. The purpose of this arrangement becomes clear from the further explanations below.

Figure 2:
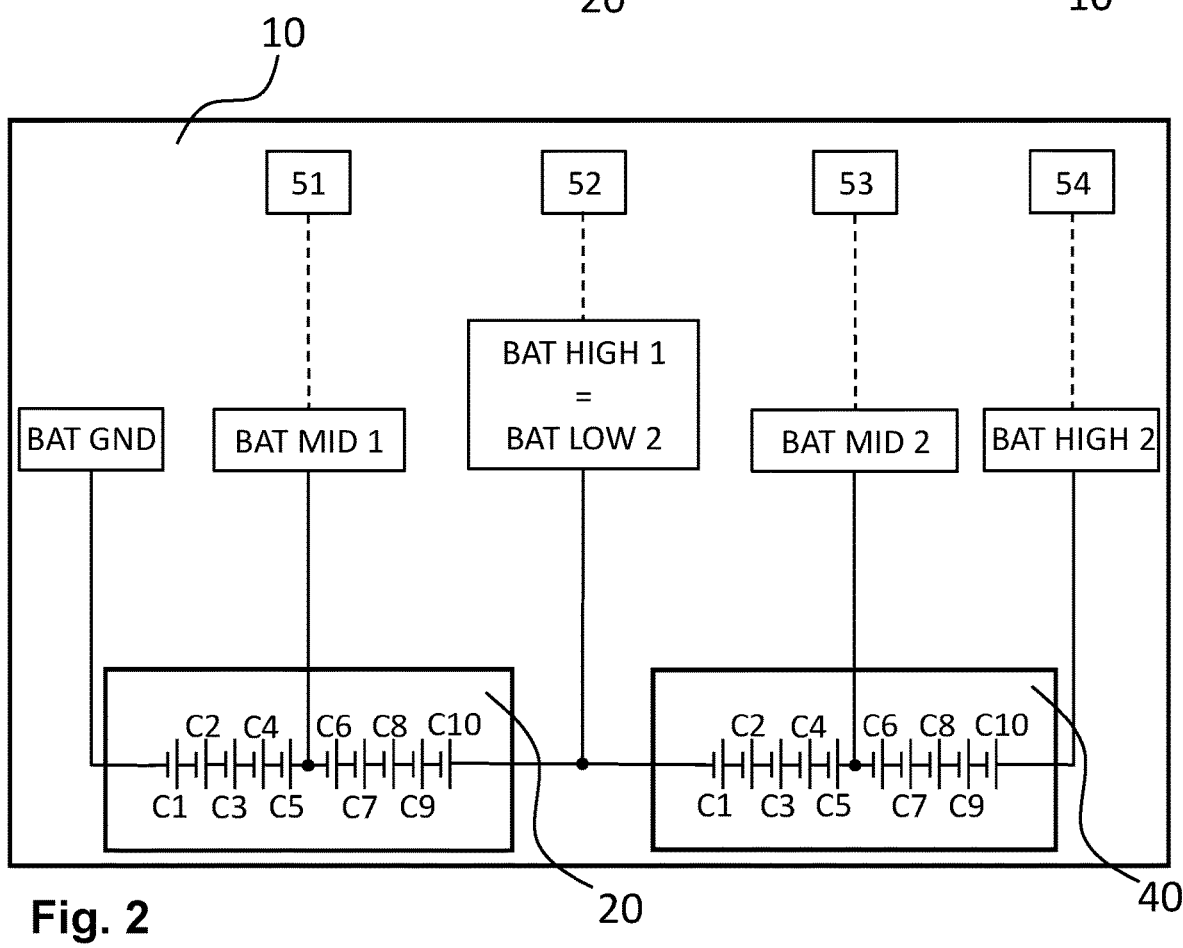
FIG. 2 shows a battery device according to the present invention in an embodiment comprising two battery storage units connected in series with each other.

FIG. 2 shows a battery device 10 in an embodiment comprising two battery storage units 20 and 40 connected in series with each other. Therein, each of the two battery storage units 20 and 40 and the voltage output terminals connected therewith as such substantially correspond to the battery storage unit 20 and the voltage output terminals BAT LOW, BAT MID and BAT HIGH connected therewith as shown in FIG. 1. Accordingly, each of the two battery storage units 20 and 40 of FIG. 2 is a specific embodiment of the battery storage unit 20 which is shown schematically in FIG. 1. Thus, each of the two battery storage units 20 and 40 together with the voltage output terminals BAT LOW, BAT MID and BAT HIGH connected therewith can also be taken alone as such, wherein the principles that were explained above with respect to FIG. 1 correspondingly apply to the respective stand-alone battery storage unit 20 or 40.

As shown in FIG. 2, each battery storage unit 20, 40 comprises a plurality of battery cells C1, C2, . . . Cn connected in series with each other between the low voltage terminal BAT GND or BAT LOW, respectively, and the high voltage terminal BAT HIGH. In FIG. 2, each battery storage unit 20, 40 comprises a row of ten battery cells C1, C2, . . . C10. Each battery cell C1, C2, . . . Cn has a predetermined electrical voltage. An intermediate voltage terminal BAT MID is connected between two adjacent battery cells of the plurality of battery cells. In each battery storage unit 20, 40 of the example of FIG. 2, one intermediate voltage terminal BAT MID1, BAT MID2 is connected between the respective adjacent fifth and sixth battery cells C5, C6 of the row of ten battery cells.

In the embodiment of FIG. 2, the low voltage terminal of the first battery storage unit 20 is the ground terminal BAT GND which as such provides no electrical voltage or a Zero voltage. Thus, the intermediate voltage terminal BAT MID1 of the first battery storage unit 20 provides an intermediate electrical voltage output which corresponds to the sum of the individual predetermined voltages of the battery cells which are connected between the ground terminal BAT GND and said intermediate voltage terminal BAT MID1, i.e. in the example of FIG. 2, the sum of the predetermined individual voltages of the five battery cells C1-C5 of the first battery storage unit 20.

The high voltage terminal BAT HIGH1 of the first battery storage unit 20 provides a high or maximum voltage output of the first battery storage unit 20 which corresponds to the sum of the individual predetermined voltages of all ten battery cells C1, C2, . . . C10 of the first battery storage unit 20 which are connected in row between the ground terminal BAT GND and said high voltage terminal BAT HIGH1.

In the embodiment shown in FIG. 2, the overall battery device 10 comprises two battery storage units 20, 40 connected in series with each other. Therein, the low voltage terminal of the first battery storage unit 20 is the ground terminal BAT GND, as explained above. The high voltage terminal BAT HIGH1 of said first battery storage unit 20 is connected to or coincides with the low voltage terminal BAT LOW2 of the second battery storage unit 40. Furthermore, one intermediate voltage terminal BAT MID1, BAT MID 2 is respectively connected between the respective adjacent fifth and sixth battery cells C5, C6 of the first battery storage unit 20 and the second battery storage unit 40. Accordingly, an intermediate voltage can be tapped or output at the intermediate voltage terminal BAT MID2 of the second battery storage unit 40 which corresponds to the sum of the predetermined voltages of the battery cells which are connected between the ground terminal BAT GND and said intermediate voltage terminal BAT MID2, i.e. in the example of FIG. 2, the sum of the predetermined individual voltages of the ten battery cells C1-C10 of the first battery storage unit 20 plus the sum of the predetermined individual voltages of the first five battery cells C1-C5 of the second battery storage unit 40.

The high voltage terminal BAT HIGH2 of the second battery storage unit 40 provides a high or maximum voltage output of the second battery storage unit 40, and thus of the overall battery device 10 as shown in FIG. 2, which corresponds to the sum of the individual predetermined voltages of the ten battery cells C1, C2, . . . C10 of the first battery storage unit 20 plus the sum of the individual predetermined voltages of the ten battery cells C1, C2, . . . C10 of the second battery storage unit 40 which are all connected in series between the ground terminal BAT GND and said high voltage terminal BAT HIGH2 of the second battery storage unit 40.

As mentioned above, a voltage can generally be tapped between any two of the various terminals BAT LOW, BAT MID and BAT HIGH of the one or more battery storage units 20, 40 irrespective of the ground terminal BAT GND. Thus, for example, a voltage can be tapped between the intermediate voltage terminal BAT MID1 and the high voltage terminal BAT HIGH1 of the first battery storage unit 20, or between the intermediate voltage terminal BAT MID1 of the first battery storage unit 20 and the intermediate voltage terminal BAT MID2 of the second battery storage unit 40. It is to be understood that any other combinations of terminals are likewise possible for the tapping of voltages.

Typically, each individual battery cell C1, C2, . . . Cn has the same predetermined electrical voltage, although it is also possible that the individual battery cells or combined groups of battery cells within the battery storage units 20, 40 have different electrical voltages.

For practical applications in a motor vehicle, particularly a utility vehicle or a commercial vehicle, it is preferred that each individual battery cell has a voltage of 2.4 V. Thus, in the case of ten battery cells within each battery storage unit 20, 40 which are connected in series with each other, as shown in FIG. 2, wherein each battery cell has the same voltage of 2.4 V, the maximum voltage of the first battery storage unit 20, i.e. the voltage obtained between the ground terminal BAT GND and the first high voltage terminal BAT HIGH1, amounts to 24 V. Accordingly, the maximum or total voltage the overall battery device 10 of FIG. 2, i.e. the voltage obtained between the ground terminal BAT GND and the high voltage terminal BAT HIGH2 of the second battery storage unit 40, amounts to 48 V.

In this example of FIG. 2, an intermediate voltage obtained at any intermediate voltage terminal BAT MID1, BAT MID 2 of the battery storage units 20, 40 equals the number of battery cells which are connected between the ground terminal BAT GND and the respective intermediate voltage terminal BAT MID1, BAT MID 2 multiplied by the predetermined voltage of said individual battery cells, i.e. here 2.4 V each. Thus, in FIG. 2, the first intermediate voltage terminal BAT MID1, which is connected between the fifth and sixth battery cells C5, C6 of the first battery storage unit 20, provides an intermediate voltage output of 12 V. Correspondingly, the second intermediate voltage terminal BAT MID2, which is connected between the fifth and sixth battery cells C5, C6 of the second battery storage unit 40, provides an intermediate voltage output of 36 V. If, for example, voltages of 4.8 V or 9.6 V are required, they are tapped by the intermediate voltage terminal BAT MID1 being connected at the second battery cell C2 or the fourth battery cell C4, respectively, of the first battery storage unit 20.

Again it is to be noted that a voltage can generally be tapped between any two of the various terminals BAT LOW, BAT MID and BAT HIGH of the first and second battery storage units 20, 40 shown in FIG. 2, irrespective of the ground terminal BAT GND. Thus, with the position of the intermediate voltage terminals BAT MID1, BAT MID2 as shown in FIG. 2, and in the above example where each individual battery cell has a voltage of 2.4 V, a voltage of 12 V can e.g. be tapped between the intermediate voltage terminal BAT MID1 and the high voltage terminal BAT HIGH1 of the first battery storage unit 20. Likewise, a voltage of 24 V can e.g. be tapped between the intermediate voltage terminal BAT MID1 of the first battery storage unit 20 and the intermediate voltage terminal BAT MID2 of the second battery storage unit 40.

As mentioned above, other numbers of battery cells C1, C2 . . . Cn within a single battery storage unit 20, 40 and/or other or different voltage values of each individual battery cell are also possible, thus resulting in other overall voltages to be obtained at the low voltage terminals BAT LOW, the high voltage terminals BAT HIGH1, BAT HIGH2 and the one or more intermediate voltage terminals BAT MID1, BAT MID2. Besides, more than two battery storage units 20, 40 can be connected in series with each other, or in any other suitable arrangement, within the complete battery device 10. The intermediate voltage terminals BAT MID1, BAT MID2 can be connected at any of the battery cells C1, C2, . . . Cn within the battery storage units 20, 40 and/or directly at the low voltage terminals BAT LOW and/or the high voltage terminals BAT HIGH1, BAT HIGH2. Therein, substantially the same principles apply as they are explained above with respect to the two battery storage units 20, 40 as shown in FIG. 2.

As further shown in FIG. 2, a separate DC-DC converter 51, 52, 53, 54 is associated with or connected with each intermediate voltage terminal BAT MID1, BAT MID2 and each high voltage terminal BAT HIGH1, BAT HIGH2. As mentioned above, the DC-DC converters 51, 52, 53, 54 are configured to compensate an asymmetrical current load on the battery cells C1, C2, . . . Cn of the battery storage units 20, 40. Furthermore, the DC-DC converters 51, 52, 53, 54 are configured to restore and/or to maintain the same state of charge of all battery cells C1, C2, . . . Cn of each battery storage unit 20, 40, in order to avoid detrimental effects for the battery storage units 20, 40 caused by a non-uniform discharging of or asymmetrical current load on the battery cells C1, C2, . . . Cn.

For every voltage level to be tapped or extracted from the battery device 10, a DC-DC converter is necessary. Whenever a voltage is extracted between two terminals, a DC-DC converter is needed to compensate the asymmetrical load. This means that depending on the number of voltages to be extracted a corresponding number of DC-DC converters is needed. FIG. 2 shows four DC-DC converters 51, 52, 53, 54 as an example. However, in other embodiments, more or less than four DC-DC converters are possible.

Typically, the DC-DC converters are integrated in or are a part of a main control board (not shown in FIG. 2), wherein the main control board is directly connected to the voltage terminals of the battery device. Thus, there is a connection between the integrated DC-DC converters (e.g. DC-DC converters 51, 52, 53, 54 in FIG. 2) and the voltage terminals (e.g. terminals BAT MID1, BAT MID2, BAT HIGH1, BAT HIGH2 in FIG. 2) to allow for compensation of the asymmetrical current loads.

The battery device 10 altogether thus provides a compact system which enables a supply of different electrical voltages, for example for an operation of different electrical consumer devices or appliances in a motor vehicle, and which enables a reduction and optimization of the weight and the volume that is occupied by the battery device, thereby rendering beneficial effects for the operation and maintenance of a vehicle.

LIST OF REFERENCE SIGNS

10 battery device
20 battery storage unit
40 battery storage unit
51-54 DC-DC converters
C1-Cn battery cells
BAT GND ground terminal
BAT LOW low voltage terminal
BAT MID1 intermediate voltage terminal
BAT MID2 intermediate voltage terminal
BAT HIGH1 high voltage terminal
BAT HIGH2 high voltage terminal

The invention claimed is:

1. A battery device for providing different electrical voltage levels to be used by different electrical consumer devices in a motor vehicle, comprising:
   at least two battery storage units, wherein each battery storage unit comprises a low voltage terminal and a high voltage terminal,
   wherein each of the at least two battery storage units further comprises at least one intermediate voltage terminal which is connected between the low voltage terminal and the high voltage terminal of the respective battery storage unit,
   wherein each of the at least two battery storage units comprises a plurality of battery cells connected in series with each other between the low voltage terminal and the high voltage terminal, wherein each of the plurality of battery cells provides a predetermined voltage,
   wherein the at least one intermediate voltage terminal is connected between two adjacent battery cells of the plurality of battery cells,
   wherein the at least two battery storage units are connected in series with each other,
   wherein the low voltage terminal of a first battery storage unit of the at least two battery storage units is a ground terminal,
   wherein the high voltage terminal of the first battery storage unit is connected to the low voltage terminal of a second battery storage unit of the at least two battery storage units,
   wherein at least one intermediate voltage terminal is respectively connected between two adjacent battery cells of the first battery storage unit or the second battery storage unit, wherein the at least one intermediate voltage terminal provides an intermediate voltage output which corresponds to a sum of the predetermined voltages of the battery cells which are connected between the ground terminal and the at least one intermediate voltage terminal,
   wherein the individual battery cells are attached to a connector rail which is slidingly engageable by a connector end of the at least one intermediate voltage terminal, and
   wherein the at least one intermediate voltage terminal is configured to be movable and variably connectable between any two adjacent battery cells of the plurality of battery cells.

2. The battery device according to claim 1,
   wherein the low voltage terminal of a first battery storage unit of the at least one battery storage unit is a ground terminal, and
   wherein the at least one intermediate voltage terminal provides an intermediate voltage output which corresponds to a sum of the predetermined voltages of the battery cells which are connected between the ground terminal and said intermediate voltage terminal.

3. The battery device according to claim 1, wherein each battery cell provides the same predetermined voltage or an integer multiple thereof.

4. The battery device according to claim 1, wherein each battery storage unit comprises battery cells that are an integer multiple of five in number.

5. The battery device according to claim 1,
   wherein the high voltage terminal of the first battery storage unit provides a voltage output of 24 V,
   wherein the high voltage terminal of the second battery storage unit provides a voltage output of 48 V, and
   wherein the at least one intermediate voltage terminal provides an intermediate voltage output which corresponds to the number of battery cells which are connected between the ground terminal and said intermediate voltage terminal multiplied by the predetermined voltage of said individual battery cells of 2.4 V.

6. The battery device according to claim 5, wherein the at least one intermediate voltage terminal provides an intermediate voltage output of 12 V and/or an integer multiple thereof and/or of 36 V.

7. The battery device according to claim 1, further comprising:
   a DC-DC converter connected with each intermediate voltage terminal and/or each low voltage terminal and/or each high voltage terminal, wherein
   the DC-DC converter is configured to compensate an asymmetrical current load on battery cells of each battery storage unit.

8. The battery device according to claim 7, wherein the DC-DC converter is configured to maintain a same state of charge of the battery cells of each battery storage unit.

9. A method for providing different electrical voltage levels for different electrical consumer devices in a motor vehicle, the method comprising utilizing of a battery device according to claim 1.

10. A utility vehicle or a commercial vehicle comprising a battery device according to claim 1.

11. The motor vehicle according to claim 10, further comprising an onboard power supply system connected to the battery device that supplies multiple voltages of integer multiples of 12 V.

* * * * *